May 1, 1956
C. W. WOOD ET AL
2,743,872
HEATER VALVE MECHANISM
Filed Sept. 18, 1950
4 Sheets-Sheet 3
Fig 11
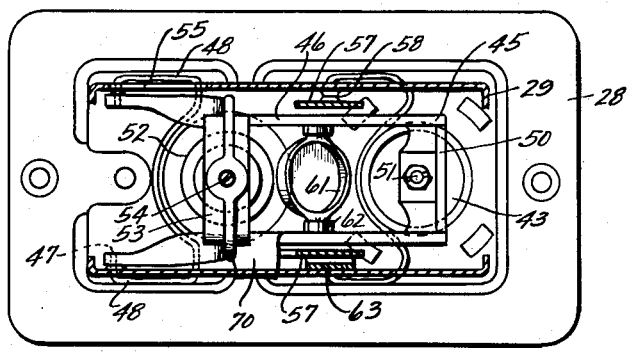
Fig 12
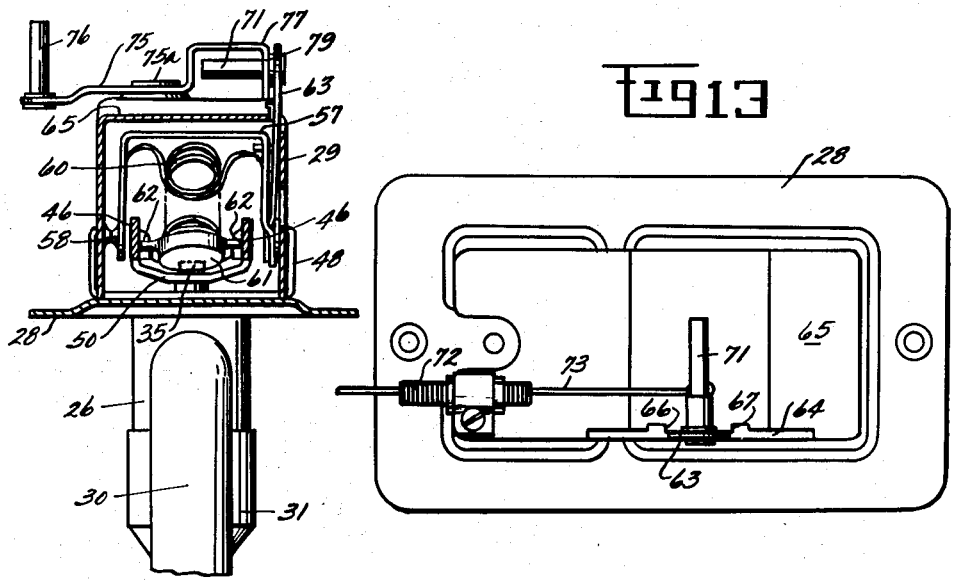
Fig 13
INVENTOR.
CHARLES W. WOOD
PAUL F. EARLY
BY
ATTORNEY May 1, 1956   C. W. WOOD ET AL   2,743,872
HEATER VALVE MECHANISM Filed Sept. 18, 1950   4 Sheets-Sheet 4

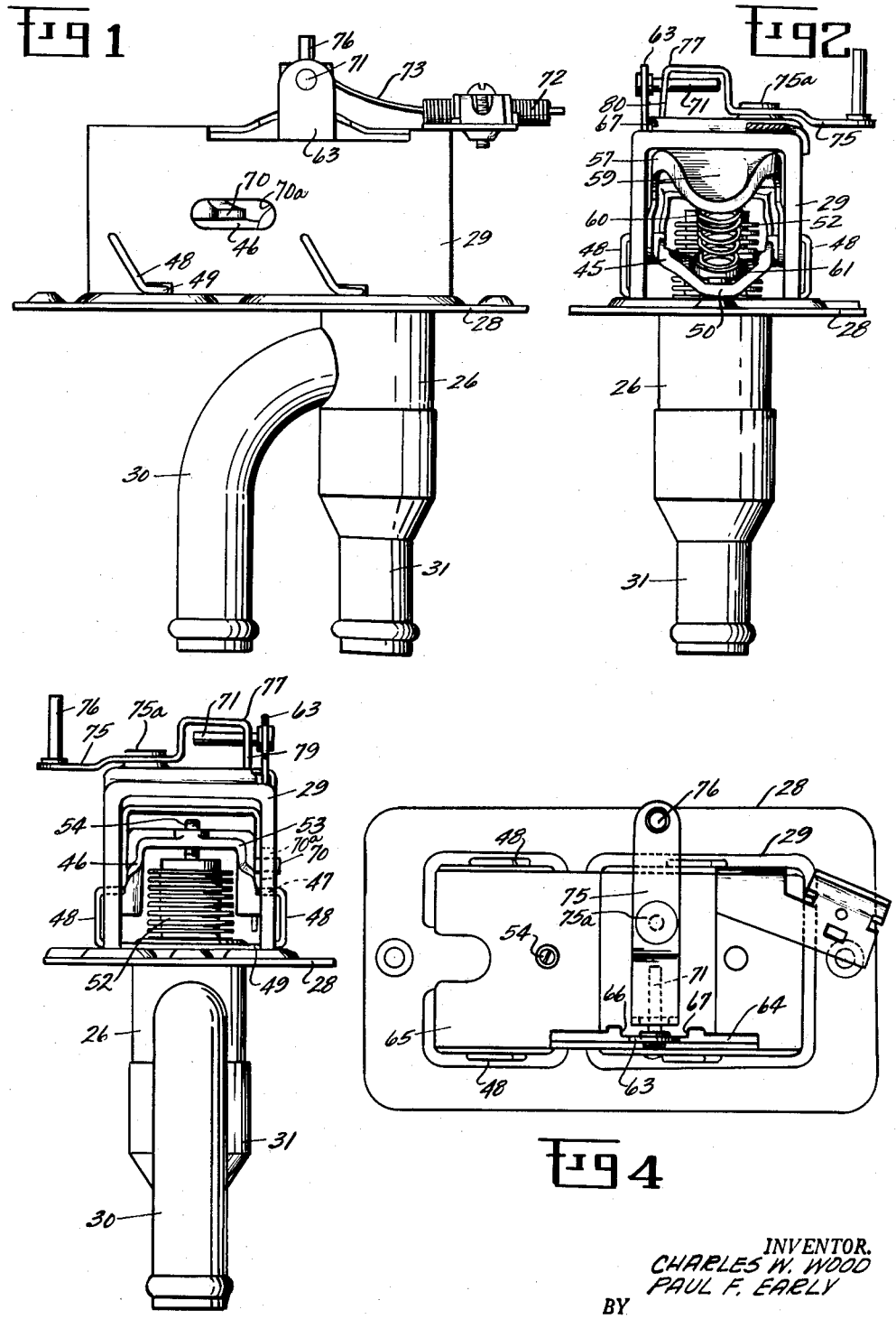

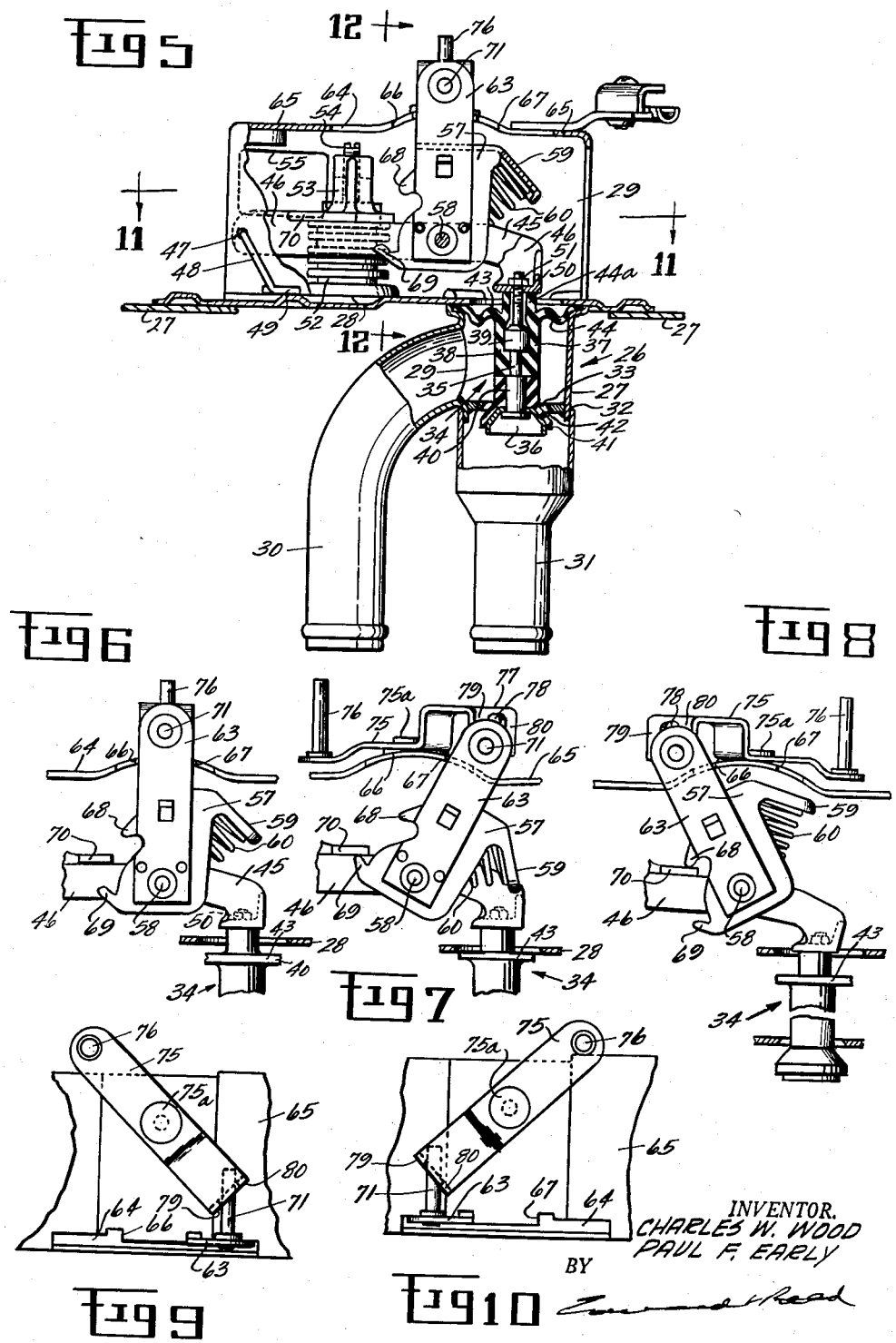

INVENTOR.
CHARLES W. WOOD
PAUL F. EARLY
BY
ATTORNEY

United States Patent Office 2,743,872
Patented May 1, 1956

2,743,872

HEATER VALVE MECHANISM

Charles W. Wood and Paul F. Early, Dayton, Ohio, assignors to Standard-Thomson Corporation, Dayton, Ohio, a corporation of Delaware Application September 18, 1950, Serial No. 185,486

24 Claims. (Cl. 236—92)

This invention relates to a valve control mechanism for a space heating system, and is designed more particularly for use in an automobile heating system.

One object of the invention is to provide a simple efficient mechanism for regulating the flow of a heating medium to an air heater.

In automobile heating systems it is common practice to utilize the engine cooling medium, usually water, as the heating medium for the air heater of the heating system. The rate of flow of the cooling medium varies with the variations in the speed of the operation of the engine, and it is a further object of the invention to so control the flow of that medium through the air heater that the temperature of the air discharged from the heater will be substantially constant for each adjusted position of the control mechanism, regardless of the rate of the flow of the cooling medium through the cooling system.

A further object of the invention is to provide such a mechanism in which the flow of the heating medium to the air heater is in part controlled by the pressure of the heating medium.

A further object of the invention is to provide such a mechanism having improved means for controlling the movement of the valve actuating member by a temperature responsive element.

A further object of the invention is to provide such a mechanism having adjustable spring means for resisting the movement of the valve actuating member by the temperature responsive element, and manually operated means for quickly and accurately adjusting said spring means.

A further object of the invention is to provide such a spring adjusting device which can be locked at the limit of its movement in one direction and released by the operating means for movement in the other direction.

A further object of the invention is to provide such a mechanism in which the valve actuating member can be locked either in valve closed position or in valve open position.

Other objects of the invention may appear as the mechanism is described in detail.

Figure 14:
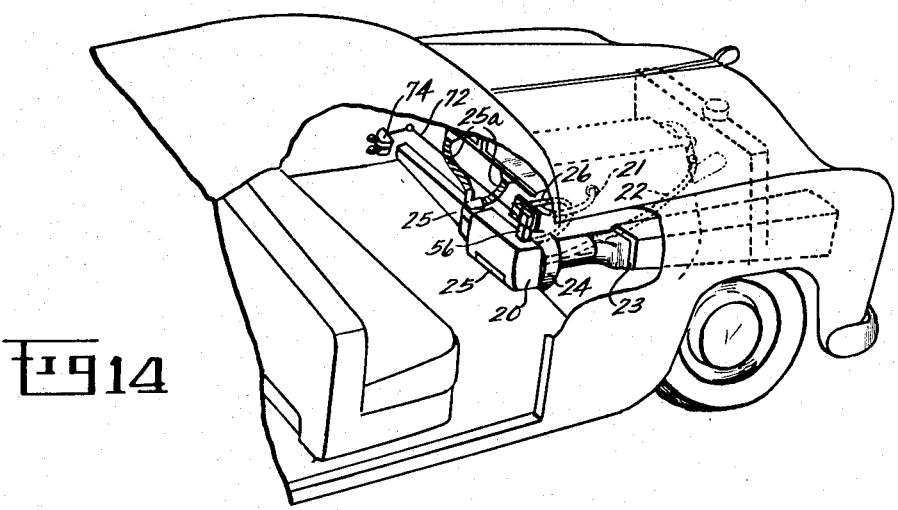
Figure 15:
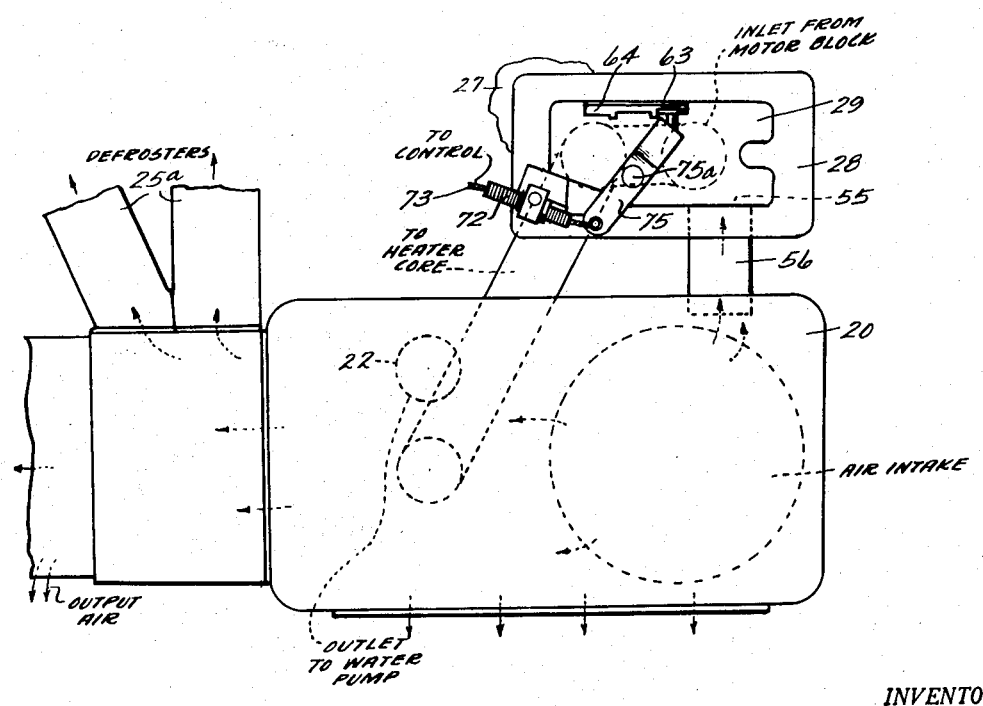

In the accompanying drawings, Fig. 1 is a side elevation of the mechanism embodying the invention; Fig. 2 is an elevation of one end of the mechanism; Fig. 3 is an elevation of the other end of that mechanism; Fig. 4 is a top plan view of the mechanism when the latter is supported in the position shown in the preceding figures; Fig. 5 is a side elevation of the control mechanism, partly broken away, to show the interior elements thereof; Figs. 6 to 8 are detail views showing the adjustable spring means in different operative positions with relation to the valve actuating member; Fig. 9 is a plan view of that portion of the apparatus shown in Fig. 7; Fig. 10 is a plan view of the same mechanism in the position shown in Fig. 8; Fig. 11 is a section taken on the line 11—11 of Fig. 5; Fig. 12 is a transverse section taken on the line 12—12 of Fig. 5; Fig. 13 is a plan view of a slightly modified arrangement of the apparatus; Fig. 14 is a schematic view of a portion of an automobile showing the apparatus installed thereon; and Fig. 15 is a schematic view showing the relation of the valve controlling mechanism to the air heater.

In these drawings we have illustrated one embodiment of our invention and have shown the same as designed more particularly for application to an automobile heating system, but it is to be understood that the mechanism as a whole, as well as the several parts thereof, may take various forms and may be used as a part of heating systems of various kinds.

The heating system in connection with which the invention is illustrated is, in its main characteristics, old in the art. As here shown this heating system comprises an air heater 20 (Fig. 15) which is shown schematically as a conventional heat exchanger, comprising a casing having therein a passage for the heating medium and an air passage for circulating air about the passage for the heating medium. One end of the heating medium passage is connected by a conduit 21 with the water jacket of an automobile engine and the other end of that passage is connected by a return conduit 22 with the cooling system in advance of the pump. The air passage is connected with a source of supply of air, such as a conduit 23 mounted under the hood of the automobile and having a forwardly facing opening at the forward end thereof and in the rear of the radiator. A motor operated fan 24 is interposed in the air conduit in advance of the air heater to draw air through the conduit and discharge the same through the air passage in the heater. The heater is provided with means for delivering the heated air to the space to be heated, which, in the present instance, is the passenger compartment of the automobile. In the arrangement shown, the heater is mounted on the dash board of the automobile within the passenger compartment and below the cowl, and is provided with outlets through which the heated air may be discharged into the passenger compartment and to the windshield defrosters, as shown at 25 and 25a.

The valve which controls the flow of the heating medium, hereinafter referred to as "water," to the heater is indicated as a whole, in Fig. 5, by the reference numeral 26. The valve comprises a casing 27 mounted on a fixed support adjacent the heater and in the present instance, is rigidly secured to a base member 28 forming a part of a housing 29, the base plate providing means whereby that housing may be mounted on a fixed support, such as the dash board. The casing is provided between its ends with an inlet 29a with which is connected an inlet fitting 30, and is provided at that end opposite the housing with an outlet fitting 31, these fittings being connected in the water conduit 21 between the water jacket and the heater. All water flowing from the cooling system to the heater must pass through the valve and the flow thereof is controlled by the valve.

At that end thereof adjacent the outlet fitting 31 the valve casing is provided with an end wall 32 having therein an outlet 33, here shown as a circular opening. Mounted in the casing is a movable valve member 34 which, in the construction shown, comprises a stem 35 extending beyond both ends of the casing and having at that end thereof which extends beyond the outlet a head 36. That end of the stem which extends beyond the other end of the casing, is adapted to be connected with a valve actuating member, as will be hereinafter described. Mounted about the valve stem 35 is a tubular structure 37 of yieldable material, such as synthetic rubber, which is held against longitudinal movement with relation to the stem, as by an annular rib 38 which extends between the enlargements 39 and 40 of the valve stem. At its lower end the tubular structure is provided with a flared portion 41 which fits snugly about the head 36 of the valve stem, and is preferably frusto-conical in form. The outer portion of the flared end of the structure has a diameter greater than the diameter of the outlet opening so that it will engage an outwardly facing valve seat, formed on the end wall 32 about the outlet, when inward movement is imparted thereto. The valve seat, as here shown, comprises the lower portion 42 of the wall of the outlet, and may be of any suitable shape. Secured to the tubular structure 37, in the upper portion of the valve casing, is a diaphragm 43 which is preferably formed integral with the tubular structure and the peripheral edge portion of which is clamped between the adjacent end of the valve casing and the supporting member 28 to tightly seal the connection between the diaphragm and the valve casing. Preferably the diaphragm is provided with circumferential corrugations 44 to permit a relatively large flexing thereof. The area of the diaphragm is substantially greater than the area of the enlarged end of the valve member and therefore water entering the valve under pressure acts on the diaphragm and tends to move the valve member in valve closing direction. In the arrangement shown the inner end 44a of the tubular structure is of reduced diameter and extends beyond the diaphragm and is adapted to yieldably engage the valve actuating member when the latter is connected with the valve stem. The head 36 of the valve stem is sometimes of a diameter greater than the internal diameter of the outer portion of the outlet fitting 31 and the movable valve member cannot be inserted in the casing through the outlet fitting. In such case the valve member may be inserted through the other, or inner, end of the casing and the outer end of the flared portion 41 of the tubular structure is engaged with the end wall 32 of the casing about the outlet 33 and pressure is applied to the valve member to cause said flared end portion to fold inwardly about the cylindrical portion of the structure and to move through the outlet. When the folded portion of the structure has been moved beyond the outlet the resiliency thereof will restore the same to its normal position on the head of the valve stem.

The valve actuating member is preferably in the form of a lever 45 pivotally mounted in the housing 29 and having means whereby it may be connected with the movable valve member. In the form here shown the lever comprises two parallel laterally spaced arms 46 which are pivotally mounted on the housing on alined axes adjacent the rear end of the lever, that end portion of the lever which is connected with the valve being herein treated as the forward portion thereof. The lever arms may be pivotally supported in any suitable manner but preferably they are spaced a short distance from the base member 28 of the housing and supported on pivot pins 47 which extend through the side walls of the housing and into bearing openings in the ends of the respective lever arms. These pivot pins are laterally extending parts of arms 48 which extend laterally from a member 49 supported on the base member and extending through the side walls of the housing. The forward end of the lever may be connected with the valve member in any suitable manner and, as here shown, the forward ends of the lever arms 46 are connected by a cross member 50 through which the valve stem 35 extends and to which the valve stem is secured by a nut 51. When so connected with the valve stem the cross member 50 is held in firm engagement with the small diameter end portion 44a of the resilient structure 37, thus providing a flexible connection between the lever and the valve member and preventing vibration.

Temperature responsive means is provided for moving the lever about its pivotal axis in valve closing direction. For this purpose there is mounted on the base 28 of the housing a sealed bellows 52, preferably containing a volatile fluid. The bellows extends between the arms 46 of the lever and is connected with the lever at a point in front of the pivotal axis thereof. As here shown, the lever arms are connected by a cross bar 53 secured to the upper edges of the arms and provided with a screw threaded opening to receive a screw 54 by which the lever is connected with the bellows. The housing 29 is open at both ends so that it is in open communication with the air in the passenger compartment and is also provided in one side wall thereof with an opening 55 arranged to receive heated air directly from the heater and to discharge the same into the housing in contact with the bellows, thereby heating the bellows to expand the same and move the forward end of the lever in a direction to move the valve member toward its valve closing position. As shown in Figs. 14 and 15, the housing is mounted on the dash board by securing the back wall, or base, 28 thereof to the dash board above the heater, and is thus supported in a substantially horizontal position with opening 55 in line with an outlet from the heater, which may be provided with a tube 56 to direct hot air through the opening 55.

The movement of the lever 45 by the bellows is resisted and controlled by spring means which is adjustable to vary the resistance so offered to the movement of the lever. In the present construction, the spring means comprises a single spring which is confined between the lever and a movable spring seat, whereby it may be moved to positions of different angularity with relation to the lever. Preferably one end of the spring is supported by a U-shaped member 57, the side members of which are pivotally mounted on the side walls of the housing on an axis transverse to the lever, as shown at 58. The outer transverse portion of the member 57 has a part forming a spring seat 59 which, in the present instance, extends downwardly and forwardly therefrom. A coil spring 60 has one end seated in the spring seat and its other end connected with the lever 45. To facilitate the movement of the spring about the axis 58 of the member 57, a second spring seat 61 is arranged between the lever arms 46 and pivotally connected therewith on alined axes adjacent the axis 58, as shown at 62. Thus the spring may be moved about the axis 58 to different angular positions with relation to the lever without materially varying the compression of the spring, and the amount of resistance offered to the movement of the lever is determined by the angular position of the spring. When the spring extends at substantially a right angle to the lever, as shown in Fig. 8, substantially the full force of the spring is exerted on the lever, and the resistance to the movement of the lever is relatively large. As the spring is moved to more acute angles to the lever the force component of the spring in the direction of lever movement decreases. In Fig. 7 it is shown in a position almost, but not quite, parallel with the lever and the force component parallel to the valve movement is relatively small.

Any suitable means may be provided for moving the spring from one position to another and in the present instance, an arm 63 rigidly connected with the member 57 extends through a slot 64 formed between one side wall of the housing and that wall 65 thereof which is opposite the base member 28, and is manually movable lengthwise of the slot to adjust the spring (Figs. 4, 9 and 10). That edge of the wall 65 which forms the inner side of the slot, is provided on opposite sides of the center thereof with shoulders 66 and 67 facing the respective ends of the slot, and the arm 63 is formed of resilient material, such as Phosphor bronze, and is so mounted that the upper portion thereof is biased toward the edge of the wall 65 and bears against the same between the shoulders 66 and 67 with such force as to yieldably retain the arm in the position to which it has been moved. In the form here shown an intermediate portion of the wall 65 is curved outwardly to provide clearance for the member 57, and the shoulders are formed on the edge of this curved portion of the wall. As the arm 63 approaches the limit of its movement in either direction the trailing edge thereof passes beyond the adjacent shoulder and the arm springs into locking engagement with that shoulder, as shown in Figs. 7 to 10, thus positively locking the spring in the position to which it has ben moved.

This locking means is also utilized to lock the valve actuating lever either in a position with the valve fully open or in a position with the valve closed. For this purpose there are connected with the lever, for movement therewith, two locking elements 68 and 69 which, in the present instance, are carried by and form parts of one of the side walls of the pivoted member 57. These locking elements are arranged on the respective sides of a part of the lever, such as a lug 70 which extends through a slot 70a in the adjacent side wall of the housing. The locking elements are so spaced that when the arm 63 is in an intermediate position both elements will be spaced from the part 70 of the lever. When the arm 63 is moved in a counterclockwise direction, Fig. 5, and approaches the limit of its movement (Fig. 8) the locking element 68 will engage the lug 70 and when the arm has moved into locking engagement with the shoulder 66 of the slot the lever will be locked in position with the valve open. When the arm is moved in a clockwise direction and approaches the other limit of its movement (Fig. 7), the locking element 69 will engage the other side of the lug and when the arm 63 has moved to locking engagement with the shoulder 67 the lever will be locked with the valve in its closed position.

Means are provided whereby the arm 63 may be moved out of locking engagement with that one of the shoulders 66 or 67 with which it is in engagement and then moved toward the opposite end of the slot. For this purpose there is secured to the arm a stud 71 which extends across the inner edge of the slot 64 to a position in which its free end is spaced a substantial distance from the arm 63. When the arm 63 is in either locked position and it is desired to release the same and move it toward the other limit of its movement, forward pressure is exerted on the stud 71 at a point spaced from the arm such a distance that the stud will flex the arm about its longitudinal axis in a direction to move the edge of the arm out of engagement with the shoulder, and to then move the arm to the desired adjusted position. Any suitable means may be provided for actuating the arm 63. In the present instance the mechanism is designed for operation by a Bowden wire, the sheath 72 of which is anchored at its respective ends to the adjacent end of the housing 29 and a fixed part of the automobile, such as the instrument panel, at a point more or less remote from the housing. The actuating member, or wire, 73 which extends through the sheathing and beyond the respective ends thereof is connected at one end to the arm 63 and at its other end with a wire actuating device 74 mounted on the support for the remote end of the sheath, as shown in Fig. 14. The sheath of the Bowden wire may be connected with either end of the housing but it is desirable that the actuating device 74 be arranged adjacent the driver's seat and therefore the wire actuating device is usually mounted adjacent the lefthand side of the automobile, as viewed from the passenger compartment and shown in Fig. 14. In some installations the sheath may be connected to that end of the housing which is adjacent the wire actuating device and in other installations may be carried about the control mechanism, bent upon itself, and the reversely extending end portion thereof connected with the opposite, or righthand, end of the housing. In this connection it should be noted that various of the views in the drawings are such as to show the housing in a reversed position, that is, turned end for end with relation to the position it occupies in the actual installation, as shown in Figs. 14 and 15. It is desirable that in both installations the wire actuating device shall move in the same direction to open the valve and in the opposite direction to close the valve. Due to the fact that in one installation that end of the wire which is connected with the arm 63 moves in the direction of the force applied to the opposite end of the wire, and in the other installation that end of the wire which is connected with the arm moves in a direction opposite from the direction of the applied force, it is necessary to provide in one installation means for reversing the direction of movement of the arm by the wire. The movement of the arm 63 to the right in Fig. 15 (to the left in Figs. 5 and 10) moves the valve to its open position, shown in Fig. 8, and the movement of that arm to the left moves the valve to its closed position, shown in Fig. 7, and inasmuch as it is desired that the valve shall be opened by the movement of the wire in a left hand direction, a lever 75 is interposed between the wire and the arm to move the arm in the direction opposite the direction of movement of the wire. As shown in the drawings the lever 75 is pivotally mounted between its ends on the wall 65 of the housing, at 75a, and is provided at its outer end with means, such as a stud 76, by which the wire may be connected thereto. At its other end, adjacent the arm 63, the lever is provided with a transverse portion 77 having an opening, such as a slot 78, through which the stud 71 of the arm extends, and which provides the transverse portion with spaced arms 79 and 80 on the respective sides of the stud. When the lever 75 is at either limit of its movement the transverse portion thereof extends obliquely to the stud 71 and when the arm is in valve opening position, the trailing arm 79, of the transverse portion of the lever 75, will engage the outer side of the stud at a substantial distance from the arm 63, usually five-eighths of an inch, and the movement of the lever 75 from its then position toward the other limit of its movement will cause the stud 71 to flex the arm about a longitudinal axis and disengage the leading edge thereof from the shoulder with which it is in engagement, and thus release the arm for further movement toward said other limit of its movement in a manner heretofore explained. When the arm 63 has been moved to said other limit of its movement, that is to valve closing position, the arm 80 of the slotted portion of the lever 75 will become the trailing arm and will likewise engage the stud at a point spaced from the arm 63, so that the movement of the lever from that position toward its first mentioned position will flex the arm 63 out of engagement with the shoulder with which it is then in engagement and release the same for further movement toward said first mentioned position.

In that installation in which the end portion of the Bowden wire is carried about the controlling mechanism, bent upon itself and connected with the right hand end of the housing, the reversed end portion of the wire 73 is directly connected with the stud 71 at a point spaced from the arm 63, and inasmuch as the reversed end portion of the wire moves in a direction opposite the direction of movement of that end portion of the wire which is connected with the actuating device, the movement of the wire to the left by the actuating device will move the arm 63 to the right, that is to valve opening position, and the right hand movement of the wire to the right by the actuating device will move the arm to the left, that is toward valve closing position. The wire being connected with the stud 71 at a point spaced from the arm, the arm will be flexed and released in the manner desired.

When no heat is required in the passenger compartment of the automobile the valve actuating device is moved to valve closing position as shown in Fig. 7, and the spring 60 exerts a minimum force on the valve actuating lever 45, but this movement of the actuating device has also locked the valve actuating lever in its closed position so that it is held against movement by the bellows regardless of the tension of the spring. When heat is required the actuating device is moved in valve opening direction and if full heat is required, is moved to the limit of its movement, as shown in Fig. 8, in which the spring exerts maximum force on the lever but the lever is locked against movement. When less than full heat is required the actuating device is moved to a selected intermediate position, such as that shown in Fig. 6, in which the spring 60 exerts on the lever a force determined by its angular position with relation to the lever and the lever is free to move. Thus when the actuating device is in any intermediate position the movement of the valve is determined by the relative forces exerted on the lever by the bellows and the spring. If the temperature increases above that contemplated by the adjustment of the actuating device the force of the bellows will overcome the force of the spring and move the lever in valve closing direction. If the temperature falls below that contemplated by the adjustment of the actuating device the force of the spring will overcome the force of the bellows and move the lever in valve opening direction.

While we have shown and described one embodiment of our invention, we wish it understood that we do not desire to be limited to the details thereof, as many modifications may occur to a person skilled in the art.

Having now fully shown and described our invention, what we claim as new and desire to secure by Letters Patent, is:

1. In a space heating system, a valve to control the flow of a heating medium to an air heater, a lever mounted on a fixed support, means for operatively connecting said valve with said lever at a point spaced from the pivotal axis thereof, a temperature responsive element connected with said lever to impart valve actuating movement thereto, a compression spring pivotally connected with said lever to resist the movement thereof by said temperature responsive element, and pivotal means for adjusting said spring to different angular positions with relation to said lever the pivotal axes of the compression spring and the pivotal means for adjustment thereof being closely adjacent to minimize the variation in compression of the spring with movement of the pivotal means.

2. In a space heating system, a valve to control the flow of a heating medium to an air heater, a supporting structure, a lever on said structure, means for operatively connecting said lever with said valve, a temperature responsive element supported on said structure and connected with said lever to impart valve actuating movement thereto, a member supported on said structure for movement lengthwise of said lever and having a spring seat spaced from said lever, a spring confined between said lever and said spring seat in compression to resist the movement of said lever by said temperature responsive element, and means for actuating said member to move said spring to selected angular positions with relation to said lever and thereby vary the resistance of said spring to the movement of said lever by said temperature responsive element, the pivotal axes of said member and said spring being closely adjacent one to the other so as to minimize the variation in compression of the spring with movement of said member.

3. In a space heating system, a valve to control the flow of a heating medium to an air heater, a supporting structure, a lever on said structure, means for operatively connecting said lever with said valve, a temperature responsive element supported on said structure and connected with said lever to impart valve actuating movement thereto, a member supported on said structure for movement about an axis adjacent to said lever and transverse to said lever and having a spring seat spaced from said lever, a coil spring confined between said lever and said spring seat to resist the movement of said lever by said temperature responsive element, and means for actuating said member to move said spring to selected angular positions with relation to said lever and thereby vary the resistance of said spring to the movement of said lever by said temperature responsive element, the pivotal axes of said member and said spring being closely adjacent one of the other so as to minimize the variation in compression of the spring with movement of said member.

4. In a space heating system, a valve to control the flow of a heating medium to an air heater, a supporting structure, a lever on said structure, means for operatively connecting said lever with said valve, a temperature responsive element supported on said structure and connected with said lever to impart valve actuating movement thereto, a spring seat connected with said lever for movement about an axis transverse thereto, a member supported on said structure for movement about an axis transverse to said lever and having a spring seat in line with and spaced from the spring seat of said lever, a coil spring confined between said spring seats to resist the movement of said lever by said temperature responsive element, and means for actuating said member to move said spring to selected angular positions with relation to said lever and thereby vary the resistance of said spring to the movement of said lever by said temperature responsive element, the pivotal axes of said member and said spring being closely adjacent one to the other so as to minimize the variation in compression of the spring with movement of said member.

5. In a space heating system, a valve to control the flow of a heating medium to an air heater, a supporting structure, a lever mounted on said structure for movement about an axis adjacent one end thereof, means for operatively connecting the other end of said lever with said valve, a temperature responsive bellows supported on said structure and engaging said lever at a point adjacent to but spaced from the axis of the latter, a spring seat on said lever between said bellows and said valve connecting means, a member mounted on said structure for movement about an axis extending transversely to said lever adjacent said spring seat and having a spring seat opposed to and spaced from the first mentioned spring seat, a coil spring confined between said spring seats to resist the movement of said lever by said bellows, and an actuating arm connected with said member to move said spring to different angular positions with relation to said lever to vary the resistance of said spring to the movement thereof, the pivotal axes of said member and said spring being closely adjacent one to the other so as to minimize the variation in compression of the spring with movement of said member.

6. In a space heating system, a valve to control the flow of a heating medium to an air heater, a supporting structure, a lever comprising two substantially parallel and laterally spaced arms connected one with the other and pivotally connected with said structure on alined axes adjacent one end of said lever, means operatively connecting the other end of said lever with said valve, a temperature responsive bellows supported on said structure between the arms of said lever and connected to said lever to impart valve actuating movement thereto, a spring seat between and pivotally connected with the arms of said lever, a member pivotally connected with said structure on an axis transverse to said lever and adjacent said spring seat, said member having a part forming a spring seat in line with and spaced from the spring seat on said lever, a coil spring confined between said spring seats to resist the movement of said lever by said temperature responsive bellows, and an arm connected with said member to move said spring to selected angular positions with relation to said lever and thereby vary the resistance thereof to the movement of said lever, the pivotal axis of the spring seat being closely adjacent the pivotal axis of the member so as to minimize the variation in compression of the spring with pivotal movement of the member.

7. In a space heating system, a valve to control the flow of a heating medium to an air heater, a supporting structure, a lever comprising two substantially parallel and laterally spaced arms connected one with the other and pivotally connected with said structure on alined axes adjacent one end of said lever, means operatively connecting the other end of said lever with said valve, a temperature responsive bellows supported on said structure between the arms of said lever and connected to said lever to impart valve actuating movement thereto, a spring seat between and pivotally connected with the arms of said lever, a member pivotally connected with said structure on an axis transverse to said lever and adjacent said spring seat, said member having a part forming a spring seat in line with and spaced from the spring seat on said lever, a coil spring confined between said spring seats to resist the movement of said lever by said temperature responsive bellows, an arm connected with said member to move said spring to selected angular positions with relation to said lever and thereby vary the resistance thereof to the movement of said lever, said structure including a part having fixed shoulders to engage said arm and lock the same at the respective limits of its movement, and means for flexing said arm to disengage the same from the shoulder with which it is in engagement and to move the same toward the other limit of its movement.

8. A valve controlling mechanism for a space heating system, comprising a housing, a lever pivotally mounted on said housing and having means whereby it may be connected with a valve, a temperature responsive element supported in said housing and connected with said lever to impart valve actuating movement thereto, a member supported on said housing for movement about an axis transverse to said lever and having a spring seat spaced from said lever, a coil spring confined between said lever and said spring seat to resist the movement of said lever by said temperature responsive element, actuating means for moving said member about its axis to move said spring to different angular positions with relation to said lever to vary said resistance, and means controlled by said actuating means for locking said lever at the limit of its movement in one direction, the pivotal axes of said member and said spring being closely adjacent one to the other so as to minimize the variation in compression of the spring with movement of said member.

9. A valve controlling mechanism for a space heating system, comprising a supporting structure, a lever pivotally mounted on said structure and having means whereby it may be operatively connected with a valve, a temperature responsive element connected with said lever to impart valve actuating movement thereto, adjustable spring means connected with said lever to resist the movement thereof by said temperature responsive element, means for locking said lever at the limits of its operative movement in either direction, and means for adjusting said spring means to different angular positions with relation to said lever to vary the resistance thereof to the movement of said lever and for actuating said locking means.

10. A valve controlling mechanism for a space heating system, comprising a supporting structure, a lever pivotally mounted on said structure and having means whereby it may be operatively connected with a valve, a temperature responsive element connected with said lever to impart valve actuating movement thereto, spring means connected with said lever and adjustable to different angular positions with relation to said lever to resist the movement thereof by said temperature responsive element, a movable member connected with said spring means to adjust the same, parts connected with said movable member for movement thereby respectively into locking relation to said lever when said movable member is moved to the limit of its operative movement in either direction, and means for releasably retaining said movable member at either limit of its movement.

11. A valve controlling mechanism for a space heating system, comprising a supporting structure, a lever pivotally mounted on said structure and having means whereby it may be operatively connected with a valve, a temperature responsive element connected with said lever to impart valve actuating movement thereto, adjustable spring means connected with said lever to resist the movement thereof by said temperature responsive element, a resilient actuating member pivotally supported on said structure and connected with said spring means to adjust the same, stops carried by said structure and arranged to be engaged respectively by said actuating member when the latter has been moved to either limit of its operative movement and to retain said actuating member in the position to which it has been moved, and means connected with said actuating member to flex the same out of engagement with the stop which is in the path thereof and to move said actuating member toward the other limit of its movement.

12. A valve controlling mechanism for a space heating system, comprising a supporting structure, a lever pivotally mounted on said structure and having means whereby it may be operatively connected with a valve, a temperature responsive element connected with said lever to impart valve actuating movement thereto, adjustable spring means connected with said lever to resist the movement thereof by said temperature responsive element, a resilient actuating member pivotally supported on said structure and connected with said spring means to adjust the same, stops carried by said structure and arranged to be engaged respectively by said actuating member when the latter has been moved to either limit of its operative movement and to retain said actuating member in the position to which it has been moved, means connected with said actuating member to flex the same out of engagement with the stop which is in the path thereof and to move said actuating member toward the other limit of its movement, and locking elements on the respective sides of a part of said lever in the path of movement thereof and connected with said actuating member for movement thereby about the pivotal axis thereof into engagement respectively with said part of said lever when the latter is moved to either limit of its operative movement.

13. A valve controlling mechanism for a space heating system, comprising a housing, a lever pivotally supported in said housing and having means whereby it may be operatively connected with a valve, a temperature responsive element connected with said lever to impart valve actuating movement thereto, a member pivotally mounted on said housing on an axis transverse to said lever and having a spring seat spaced from said lever, a coil spring confined between said lever and said spring seat to resist the movement of said lever by said temperature responsive element, a wall of said housing having an edge provided with oppositely facing spaced shoulders, an arm connected with said pivoted member to move said spring to selected angular positions with relation to said lever, said arm extending across and being biased toward said edge of said wall whereby it will move into retaining engagement with one of said shoulders when said arm is moved to one limit of its operative movement, and means for flexing said arm about a longitudinal axis to disengage the same from said shoulder and then move the same toward the other limit of its movement.

14. A valve controlling mechanism for a space heating system, comprising a housing, a lever pivotally supported in said housing and having means whereby it may be operatively connected with a valve, a temperature responsive element connected with said lever to impart valve actuating movement thereto, a member pivotally mounted on said housing on an axis transverse to said lever and having a spring seat spaced from said lever, a coil spring confined between said lever and said spring seat to resist the movement of said lever by said temperature responsive element, a wall of said housing having an edge provided with oppositely facing spaced shoulders, a relatively narrow resilient arm connected with said pivoted member to move said spring to selected angular positions with relation to said lever, said arm extending across and being biased toward said edge of said wall whereby it will move into retaining engagement with one of said shoulders when said arm is moved to one limit of its operative movement, a stud secured to said arm, and a lever mounted on said housing and having a part to engage said stud at a point spaced from said arm and flex said arm about a longitudinal axis to disengage the same from said shoulder and then move said arm toward the other limit of its movement.

15. A valve controlling mechanism for a space heating system, comprising a housing, a lever pivotally supported in said housing and having means whereby it may be operatively connected with a valve, a temperature responsive element connected with said lever to impart valve actuating movement thereto, a member pivotally mounted on said housing on an axis transverse to said lever and having a spring seat spaced from said lever a coil spring confined between said lever and said spring seat to resist the movement of said lever by said temperature responsive element, a wall of said housing having an edge provided with oppositely facing spaced shoulders, a flat resilient arm rigidly connected with said pivoted member to move said spring to selected angular positions with relation to said lever, said arm extending across said edge of said wall and being biased toward said edge to engage the same between said shoulders and to move into retaining engagement with either of said shoulders when it is moved beyond the same, a stud rigid with the outer end portion of said arm and extending across said edge of said wall, and a lever mounted on said wall for movement about an axis spaced from and extending lengthwise of said arm, said lever having a transverse end portion provided with an opening through which said stud loosely extends, the transverse portion of the last mentioned lever being so spaced from said arm that when said arm is in engagement with either of said shoulders the movement of said last mentioned lever will cause said transverse portion thereof to engage said stud at a point spaced from said arm and flex said arm to disengage the same from said shoulder.

16. A value controlling mechanism for a space heating system, comprising a housing, a lever pivotally supported in said housing and having means whereby it may be operatively connected with said valve, a temperature responsive element connected with said lever to impart valve actuating movement thereto, a member pivotally mounted on said housing on an axis transverse to said lever and having a spring seat spaced from said lever, a coil spring confined between said lever and said spring seat to resist the movement of said lever by said temperature responsive element, a wall of said housing having an edge provided with oppositely facing spaced shoulders, locking elements connected with said pivoted member for movement thereby respectively into engagement with said lever when said lever is at either limit of its operative movement, an arm connected with said pivoted member to move said spring to selected angular positions with relation to said lever, said arm extending across and being biased toward said edge of said wall whereby it will move into retaining engagement with one of said shoulders when said arm is moved to one limit of its operative movement, and means for flexing said arm about a longitudinal axis to disengage the same from said shoulder and then move the same toward the other limit of its movement.

17. In a heating system, a valve actuating lever, temperature responsive means for moving said lever in one direction, spring means for moving said lever in the other direction, and a valve including a casing having at one end thereof an outlet and an outwardly facing valve seat surrounding said outlet, and having between the ends thereof an inlet, and a movable valve member comprising a stem extending through said casing, connected at one end with said lever and having a head on that end thereof which extends through said outlet, and a tubular structure of yieldable material extending about and secured to said stem and having a flared portion extending over the inner side of said head, said structure also having a wide relatively thin circumferential part secured at its peripheral edge to said casing on a line spaced inwardy from said inlet and constituting a diaphragm operable by fluid in said casing to actuate said valve.

18. In a heating system, a valve actuating lever, temperature responsive means for moving said lever in one direction, spring means for moving said lever in the other direction, and a valve including a casing having at one end thereof an outlet and an outwardly facing valve seat surrounding said outlet, and having between the ends thereof an inlet, and a movable valve member comprising a stem extending through said casing, connected at one end with said lever and having a head on that end thereof which extends through said outlet, and a tubular structure of yieldable material extending about and secured to said stem and having a flared portion extending over the inner side of said head, said structure also having a wide relatively thin circumferential part secured at its peripheral edge to said casing on a line spaced inwardly from said inlet and constituting a diaphragm operable by fluid in said casing to actuate said valve, said tubular structure also having a portion extending beyond said diaphragm and engaging that portion of said lever with which said stem is connected.

19. In a heating system, a valve actuating lever, temperature responsive means for moving said lever in one direction, spring means for moving said lever in the other direction, and a valve including a casing having at one end thereof an outlet and an outwardly facing valve seat surrounding said outlet, and having between the ends thereof an inlet, and a movable valve member comprising a stem extending through said casing, connected at one end with said lever and having at its other end a head which extends outwardly beyond said valve seat, and having between its ends a circumferential groove, a tubular structure of yieldable material extending about said stem and having a part extending into said groove, said structure having at one end thereof an enlarged portion extending through said outlet and between said head and said valve seat, and having adjacent the other end thereof a relatively thin circumferential part integral therewith and secured at its periphery to said casing to form a diaphragm which closes the adjacent end of said casing and is operable by fluid in said casing to actuate said valve.

20. In a heating system, a valve actuating lever, temperature responsive means for moving said lever in one direction, spring means for moving said lever in the other direction, and a valve including a casing having at one end thereof an outlet and an outwardly facing valve seat surrounding said outlet, and having between the ends thereof an inlet, and a movable valve member having at one end a head extending outwardly through and beyond said valve seat, means connecting said lever with the other end of said stem for movement lengthwise of said stem, and a tubular structure of resilient material extending about and secured to said stem and having at one end a portion extending through said outlet and between said head and said valve seat, said structure having at one end thereof a tubular part extending about said stem and engaging said lever to yieldably resist the movement of the latter in one direction with relation to said stem.

21. In an apparatus for controlling the flow of fluid through a conduit, a valve comprising a casing having an inlet, an outlet and a valve seat surrounding said outlet, a movable valve member including a valve stem having a head at one end thereof, and a tubular structure of yieldable material extending about and secured to said stem and having a part extending between said head and said valve seat, a diaphragm connecting said structure with said casing inwardly beyond said inlet and operable by fluid in said casing to actuate said valve, said tubular structure having a part extending beyond said diaphragm, a lever connected with said stem and bearing on the last mentioned part of said structure, and means for actuating said lever to control said valve.

22. In an apparatus for controlling the flow of fluid through a conduit, a valve comprising a casing having an inlet, an outlet and a valve seat surrounding said outlet, a movable valve member including a valve stem having a head at one end thereof, and a tubular structure of yieldable material extending about and secured to said stem and having a part extending between said head and said valve seat, a diaphragm connecting said structure with said casing inwardly beyond said inlet and operable by fluid in said casing to actuate said valve, a lever connected with said structure, and means for actuating said lever to control said valve.

23. In a heating system, a valve actuating lever, temperature responsive means for moving said lever in one direction, spring means for moving said lever in the other direction, and a valve including a casing having at one end thereof an outlet and an outwardly facing valve seat surrounding said outlet, and having between the ends thereof an inlet, and a movable valve member comprising a stem extending through said casing, connected at one end with said lever and having a head on that end thereof which extends through said outlet, and a tubular structure of yieldable material extending about and secured to said stem and having a wide, relatively thin circumferential part secured at its peripheral edge to said casing on a line spaced inwardly from said inlet and constituting a diaphragm operable by fluid in said casing to actuate said valve, said tubular structure also having a portion extending beyond said diaphragm and engaging that portion of said lever with which said stem is connected.

24. A valve controlling mechanism comprising support structure, a lever pivotally supported by the support structure and having means whereby it may be operatively connected with a valve, a temperature responsive element connected with said lever to impart valve actuating movement thereto, a spring seat pivotally carried by the lever, an elongated compression spring having one end positioned in said spring seat, a spring cap member movably carried by the support structure, and means pivotal about an axis adjacent the lever for moving said spring cap member to vary the angle between the lever and the spring, the pivotal axis of said pivotal means and the pivotal axis of said spring being parallel.

References Cited in the file of this patent

UNITED STATES PATENTS

| | | |
|---|---|---|
| 554,455 | McKay | Feb. 11, 1896 |
| 909,176 | Fulton | Jan. 12, 1909 |
| 1,847,911 | Trane | Mar. 1, 1932 |
| 2,106,671 | Watson | Jan. 25, 1938 |
| 2,391,703 | Hughes | Dec. 25, 1945 |
| 2,437,883 | Mallory | Mar. 16, 1948 |
| 2,538,212 | Raney | Jan. 16, 1951 |
| 2,595,813 | Raney | May 6, 1952 |
| 2,602,593 | Raney | July 8, 1952 |

FOREIGN PATENTS

| | | |
|---|---|---|
| 212,217 | Great Britain | Oct. 23, 1924 |
| 681,192 | Germany | Sept. 16, 1939 |